United States Patent
Onoyama et al.

(10) Patent No.: US 6,881,170 B2
(45) Date of Patent: Apr. 19, 2005

(54) VEHICLE WITH AUTOMATIC ENGINE STOP/RESTART FUNCTION AND AUTOMATIC ENGINE STOP/RESTART SYSTEM AND METHOD FOR VEHICLE

(75) Inventors: Taiichi Onoyama, Yokohama (JP); Hiroshi Abe, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 83 days.

(21) Appl. No.: 10/405,628

(22) Filed: Apr. 3, 2003

(65) Prior Publication Data

US 2003/0197385 A1 Oct. 23, 2003

(30) Foreign Application Priority Data

Apr. 23, 2002 (JP) ......................................... 2002-120382
Dec. 3, 2002 (JP) ......................................... 2002-350655

(51) Int. Cl.[7] ............................................. B60K 41/12
(52) U.S. Cl. ........................................... 477/39; 477/37
(58) Field of Search .............................. 290/40 R, 40 C; 477/39, 37, 44, 78, 99, 97, 111, 167, 181

(56) References Cited

U.S. PATENT DOCUMENTS

| 4,858,496 | A | * | 8/1989 | Iwatsuki et al. | 477/33 |
| 6,093,974 | A | * | 7/2000 | Tabata et al. | 290/40 R |
| 6,422,972 | B1 | * | 7/2002 | Eguchi | 477/107 |
| 6,656,083 | B1 | * | 12/2003 | Esaki | 477/5 |
| 6,695,744 | B1 | * | 2/2004 | Shimabukuro et al. | 477/102 |
| 2002/0029943 | A1 | * | 3/2002 | Totsuka et al. | 188/113 |
| 2002/0116113 | A1 | * | 8/2002 | Kaneko | 701/112 |
| 2004/0029677 | A1 | * | 2/2004 | Mori et al. | 477/3 |

FOREIGN PATENT DOCUMENTS

| JP | 11-132321 A | 5/1999 |
| JP | 2000-213389 A | 8/2000 |

* cited by examiner

*Primary Examiner*—Karl Tamai
*Assistant Examiner*—Julio Gonzalez
(74) *Attorney, Agent, or Firm*—Foley & Lardner LLP

(57) ABSTRACT

A vehicle with an automatic engine stop/restart function comprises an engine, an automatic transmission having an oil pump driven in synchronism with the engine to supply an oil pressure to the automatic transmission, an oil pressure controller to hold the oil pressure in the automatic transmission during an automatic stop of the engine, and a control system. The control system is configured to: determine whether the oil pressure in the automatic transmission becomes lower than a predetermined value during the engine automatic stop; shift the automatic transmission into a neutral state when the oil pressure in the automatic transmission becomes lower than a predetermined value during the engine automatic stop; restarts the engine; and then, shift the automatic transmission into a drive state after the oil pressure in the automatic transmission is increased to the predetermined value by the oil pump driven in synchronism with the engine.

14 Claims, 7 Drawing Sheets

VEHICLE WITH AUTOMATIC ENGINE STOP/RESTART FUNCTION AND AUTOMATIC ENGINE STOP/RESTART SYSTEM AND METHOD FOR VEHICLE

BACKGROUND OF THE INVENTION

The present invention relates to a vehicle with an automatic engine stop/restart function and an automatic engine stop/restart system and method for a vehicle.

A vehicle equipped with an automatic engine stop/restart function (so-called an "idle stop control function") is known for improved fuel efficiency and reduced exhaust emission. The automatic engine stop/restart function allows an engine to stop automatically when the vehicle makes a stop to e.g. wait at a traffic light with an automatic transmission held in a drive state, and allows the engine to restart automatically when the vehicle starts traveling again.

SUMMARY OF THE INVENTION

The automatic engine stop/restart function also allows the engine to restart automatically, when an oil pressure in the automatic transmission drops during an automatic stop of the engine, as disclosed in Japanese Laid-Open Patent Publication No. 2000-213389.

However, there is a case where the transmission oil pressure rapidly drops due to a malfunction in a hydraulic system of the automatic transmission. The above automatic engine stop/restart function causes the engine to restart automatically, even in such a case, in response to the oil pressure drop. Then, engine power is transferred to the automatic transmission without sufficient transmission oil pressure. It is detrimental to the durability of the automatic transmission.

It is therefore an object of the present invention to provide a vehicle with an automatic engine stop/restart function, in which an engine can restart from an automatic stop state without deteriorating the durability of an automatic transmission, when an oil pressure in the automatic transmission is lowered during an automatic stop of the engine.

It is also an object of the present invention to provide an automatic engine stop/restart system and method for a vehicle, by which an engine can restart from an automatic stop state without deteriorating the durability of an automatic transmission, when an oil pressure in the automatic transmission is lowered during an automatic stop of the engine.

According to a first aspect of the present invention, there is provided a vehicle with an automatic engine stop/restart function, comprising: an engine; an automatic transmission having an oil pump driven in synchronism with the engine to supply an oil pressure to the automatic transmission; an oil pressure controller to hold the oil pressure in the automatic transmission during an automatic stop of the engine; and a control system configured to: stop the engine automatically when an automatic engine stop condition is satisfied; restart the engine automatically in a first mode when an automatic engine restart condition is satisfied; determine whether the oil pressure in the automatic transmission becomes lower than a predetermined value during the automatic stop of the engine; shift the automatic transmission into a neutral state when the oil pressure in the automatic transmission becomes lower than a predetermined value during the automatic stop of the engine; restart the engine in a second mode after the automatic transmission is shifted to the neutral state; and shift the automatic transmission into a drive state after the oil pressure in the automatic transmission is increased to the predetermined value by the oil pump driven in synchronism with the engine.

According to a second aspect of the present invention, there is provided an automatic engine stop/restart system for a vehicle, the system comprising: means for stopping an engine automatically upon satisfaction of an automatic engine stop condition; means for determining whether an oil pressure in an automatic transmission of the vehicle becomes lower than a predetermined value during an automatic stop of the engine; means for restarting the engine automatically upon satisfaction of an automatic engine restart condition, when the oil pressure in the automatic transmission is higher than or equal to the predetermine value; means for shifting the automatic transmission into a neutral state, when the oil pressure in the automatic transmission becomes lower than the predetermined value during the automatic stop of the engine; means for restarting the engine automatically while the automatic transmission is in the neutral state; and means for shifting the automatic transmission from the neutral state to a drive state after the oil pressure in the automatic transmission is increased to the predetermined value by an oil pump driven in synchronism with the engine.

According to a third aspect of the present invention, there is provided an automatic engine stop/restart method for a vehicle, the method comprising: determining whether an oil pressure in an automatic transmission of the vehicle becomes lower than a predetermined value while an engine of the vehicle is in an automatic stop state; restarting the engine automatically from the automatic stop state upon satisfaction of an automatic engine restart condition, when the oil pressure in the automatic transmission is higher than or equal to the predetermined value; shifting the automatic transmission into a neutral state, when the oil pressure in the automatic transmission is lower than the predetermined value; restarting the engine automatically from the automatic stop state while the automatic transmission is in the neutral state; and shifting the automatic transmission from the neutral state to a drive state, after the oil pressure in the automatic transmission is increased to the predetermined value by an oil pump driven in synchronism with the engine.

DESCRIPTION OF THE EMBODIMENTS

Hereinafter, the present invention will be described in detail with reference to the drawings.

Figure 1:
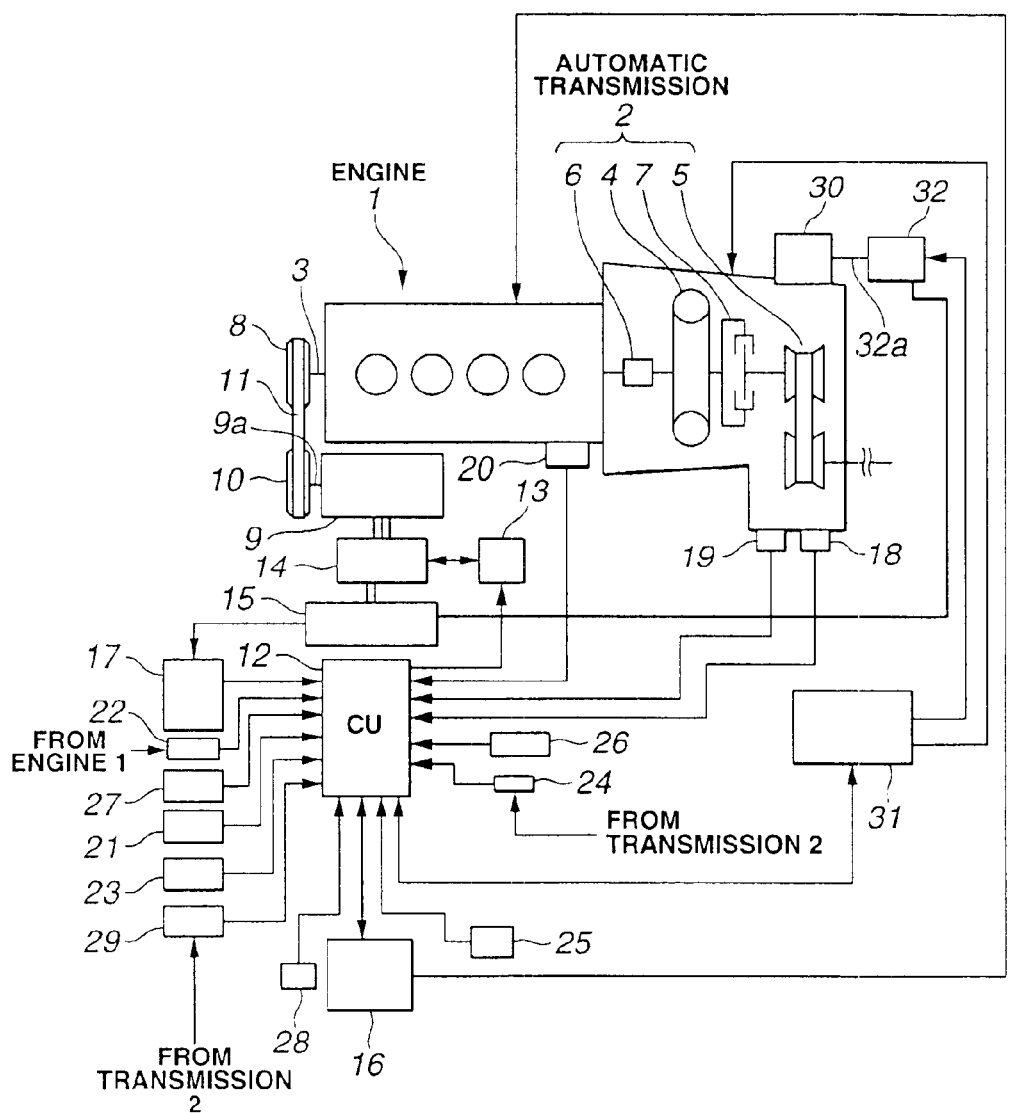
FIG. 1 is a system configuration of a vehicle in which the present invention can be embodied.

FIG. 1 shows a system configuration of a vehicle in which the present invention can be embodied.

Engine 1 is connected at one side thereof to automatic transmission 2.

Automatic transmission 2 has torque converter 4 to receive power from crankshaft 3 (i.e. a power output shaft of engine 1), belt-type continuously variable transmission (CVT) unit 5 connected to engine 1 via torque converter 4, main oil pump 6 driven in synchronism with crankshaft 3 to supply an oil pressure to automatic transmission 2 during the running of engine 1, and forward clutch 7 disposed between torque converter 4 and CVT unit 5. CVT unit 5 is connected at an output side thereof to driving wheels (not shown) via a reduction gear (not shown). Alternatively, a stepwise transmission unit may be used in place of CVT unit 5.

Automatic transmission 2 works under the control of CVT controller 31 to e.g. engage and disengage forward clutch 7.

Engine 1 is connected at the other side thereof to AC motor/generator 9. Motor shaft pulley 10 rotates together with output shaft 9a of AC motor/generator 9, whereas crankshaft pulley 8 rotates together with crankshaft 3. Belt 11 is placed around crankshaft pulley 8 and motor shaft pulley 10 so that crankshaft 3 and AC motor generator rotate in synchronism with each other.

AC motor/generator 9 is driven i.e. started, stopped and switched between power running mode and regenerative running mode under the control of motor controller 13. In the power running mode for engine motoring etc., AC motor/generator 9 takes electric power from battery 15 via inverter 14. In the regenerative running mode, AC motor/generator 9 generates electric power from the rotation of engine 1 to put battery 15 on charge.

Further, an oil pressure controller is provided to hold the oil pressure in automatic transmission 2 during an automatic stop of the engine 1. For example, auxiliary oil pump 30 and motor 32 constitutes the oil pressure controller. Auxiliary oil pump 30 is directly connected to motor shaft 32a of motor 32, and motor 32 is driven under the control of CVT controller 31. Namely, auxiliary oil pump 30 is controlled from CVT controller 31.

Total control unit 12 is linked with engine controller 16, CVT controller 31 and motor controller 13. Total control unit 12 receives input about the oil temperature of automatic transmission 2, the oil pressure in automatic transmission 2, the coolant temperature of engine 1, the accelerator pedal depression, the engine speed, the vehicle speed, the position of a selector lever of automatic transmission 2, the opening and closing state of all open/close members of the vehicle (such as doors and a hood), the negative pressure of a brake booster (used to assist brake pedal movement), the brake pedal depression, the brake fluid pressure and the output shaft rotation speed of torque converter 4 via oil temperature sensor 18, oil pressure sensor 19, coolant temperature sensor 20, accelerator pedal sensor 21, engine speed sensor 22, vehicle speed sensor 23, selector lever position sensor 24, open/close sensor 25, brake booster pressure sensor 26, brake pedal sensor 27, brake fluid pressure sensor 28 and torque converter rotation sensor 29, respectively. Total control unit 12 also receives input about the state of charge (SOC) of battery 15 via battery controller 17. Based on the received input, total control unit 12 controls various operations of engine 1, automatic transmission 2 and AC motor/generator 9 by means of engine controller 16, CVT controller 31 and motor controller 13, respectively.

In the following first and second embodiments of the present invention, total control unit 12 automatically stops engine 1 by terminating fuel injection upon detection of an automatic engine stop request when the vehicle makes a stop after the warm up, and automatically restarts engine 1 upon detection of an automatic engine restart request when the vehicle starts traveling again.

Figure 2:
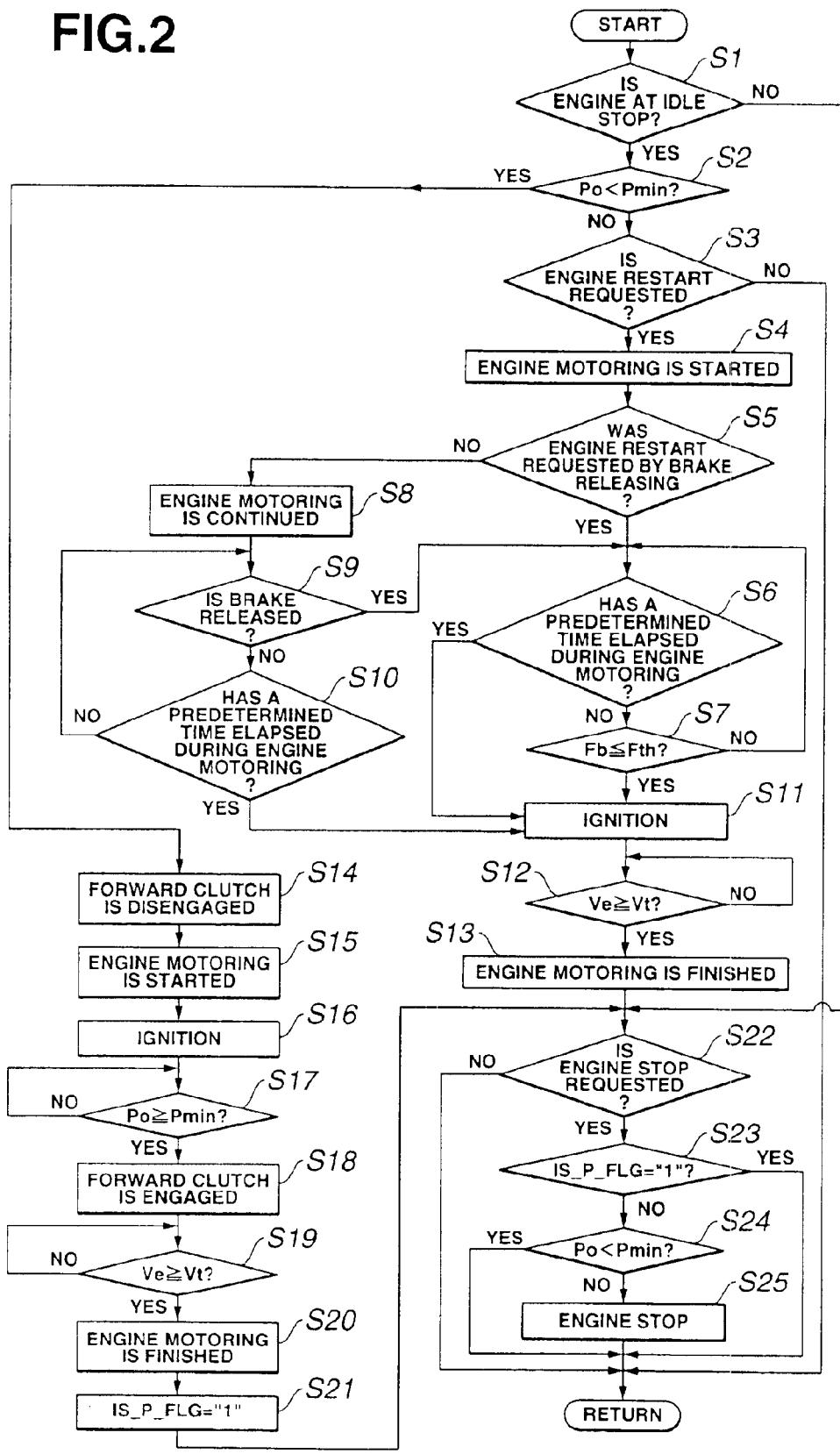
FIG. 2 is a flowchart for an automatic engine stop/restart program according to a first embodiment of the present invention

FIG. 2 is a flowchart for an automatic engine stop/restart program ran by total control unit 12 according to the first embodiment of the present invention.

In step S1, total control unit 12 examines whether engine 1 is in an automatic stop state (i.e. whether engine 1 is at idle stop). If Yes in step S1, the routine goes to step S2. If No in step S1, the routine goes to step S22.

In step S2, total control unit 12 reads the input from oil pressure sensor 19, and determines whether the oil pressure Po in automatic transmission 2 becomes smaller than a predetermined minimum operating pressure value Pmin. The minimum operating pressure value Pmin is defined as a transmission oil pressure required to transfer engine torque via a torque transferring belt of CVT unit 5 at the starting of engine 1 while preventing the belt from slipping due to a drop in CVT line pressure etc. If No in step S2, the routine goes to step S3. If Yes in step S2, the routine proceeds to step S15.

In step S3, total control unit 12 judges whether the automatic engine restart is requested. More specifically, total control unit 12 reads the input from accelerator pedal sensor 21, brake pedal sensor 27, brake fluid pressure sensor 28, battery controller 17, brake booster pressure sensor 26, coolant temperature sensor 20 and oil temperature sensor 18, and checks whether either one of the following conditions is satisfied during the automatic stop of engine 1, with the selector lever of automatic transmission 2 held in D range, the brake pedal pressed by a driver, the vehicle speed being 0 km/h and all the open/close members closed.

(1) The accelerator pedal depression is larger than or equal to a predetermined amount (e.g. 2 deg.).
(2) The brake pedal depression is smaller than or equal to a predetermined amount, or the brake fluid pressure is lower than or equal to a predetermined value (e.g. 0.3 MPa).
(3) The charge state of battery 15 is smaller than or equal to a predetermined level (e.g. 60% for lead-acid battery; and 45% for Ni-NM battery).
(4) The negative pressure of the brake booster is smaller than or equal to a predetermined value (e.g. 8 MPa).
(5) The coolant temperature of engine 1 is lower than or equal to a predetermined value (e.g. 55° C.).
(6) The oil temperature of automatic transmission 2 is lower than or equal to a predetermined value (e.g. 55° C.).

Total control unit 12 judges that the automatic engine restart is requested when any of the automatic engine restart conditions (1) to (6) is satisfied. If Yes in step S3, the routine goes to step S4. If No in step S3, the routine returns to step S1.

In step S4, total control unit 12 immediately causes motor controller 13 to actuate AC motor/generator 9 in the power running mode, thereby starting the motoring of engine 1.

In step S5, total control unit 12 judges whether the automatic engine restart request is derived from the above brake releasing condition (2). If Yes in step S5, the routine goes to step S6. If No in step S5, the routine goes to step S8.

In step S6, total control unit 12 examines whether a predetermine time period (e.g. 1 to 2 seconds) has been elapsed since the motoring of engine 1 was started. If No in step S6, the routine goes to step S7.

In step S7, total control unit 12 judges whether the braking force Fb becomes smaller than or equal to a predetermined threshold Fth at which ignition is permitted. The braking force Fb is generally proportional to the brake pedal depression and the brake fluid pressure. Based on the input from brake pedal sensor 27 or brake fluid pressure sensor 28, total control unit 12 can thus judge the braking force Fb to be smaller than or equal to the threshold Fth when the brake pedal depression is smaller than or equal to a predetermined ignition permit threshold amount or the brake fluid pressure is smaller than or equal to a predetermined ignition permit threshold value. If Yes in step S7, the routine goes to step S11.

If Yes in step S6, the routine goes to step S11 regardless of whether the braking force Fb is lower than or equal to the threshold Fth (i.e. regardless of whether the brake fluid pressure or brake pedal depression is smaller or equal to the threshold amount or value).

In step S8, total control unit 12 allows a continuation of the motoring of engine 1. While continuing the motoring of engine 1, total control unit 12 reads the input from brake pedal sensor 27 and brake fluid pressure sensor 28 and judges whether the brake releasing condition (2) becomes satisfied in step S9. If Yes in step S9, the routine goes to step S6. If No in step S9, total control unit 12 examines in step S10 whether a predetermined time period (e.g. 1 to 2 seconds) has been elapsed since the motoring of engine 1 was started. If Yes in step S10, the routine goes to step S11. If No in step S10, the routine goes back to step S9.

In step S11, total control unit 12 allows engine controller 16 to cause ignition in engine 1.

In step S12, total control unit 12 reads the input from engine speed sensor 22 and determines whether the engine speed Ve reaches a target engine speed Vt. The target engine speed Vt corresponds to an engine idle speed. In consideration of engine speed overshoot, total control unit 12 determines that the engine speed Ve comes to the above target engine speed Vt when the engine speed Ve is kept to at least the target engine speed Vt for a predetermine time period. If Yes in step S12, the routine goes to step S13.

In step S13, total control unit 12 causes motor controller 13 to stop AC motor/generator 9, thereby finishing the motoring of engine 1.

In a case where the oil pressure Po in automatic transmission 2 becomes lower than the minimum operating pressure value Pmin during the automatic stop of engine 1 (Yes in step S2), it is conceivable that there is a malfunction in the oil pressure controller e.g. motor 32 used to actuate auxiliary oil pump 30. Thus, engine 1 needs to be restarted to drive main oil pump 6 and thereby increase the oil pressure Po in automatic transmission 2. However, if forward clutch 7 is being engaged at the time of restart of engine 1, engine torque is transferred to automatic transmission 2 with the oil pressure Po in automatic transmission 2 being lowered. In particular, there arises a high possibility that a pulley is not pressed against the torque transferring belt of CVT unit 5 assuredly due to a drop in CVT line pressure etc., so that torque transferring belt of CVT unit 5 slips. It is detrimental to the durability of automatic transmission 2, notably the torque transferring belt of CVT unit 5. In order to avoid such a detriment, engine 1 is restarted by the following procedure.

In step S14, total control unit 12 causes CVT controller 31 to bring forward clutch 7 into disengagement so that automatic transmission 2 is shifted into a neutral state.

In step S15, total control unit 12 immediately causes motor controller 13 to actuate AC motor/generator 9 in the power running mode, thereby starting the motoring of engine 1.

In step S16, total control unit 12 allows engine controller 16 to cause ignition in engine 1.

In step S17, total control unit 12 reads the input from oil pressure sensor 19 and determines whether the oil pressure Po in automatic transmission 2 becomes larger than or equal to the minimum operating pressure value Pmin. If Yes in step S17, the routine goes to step S18.

In step S18, total control unit 12 causes CVT controller 31 to bring forward clutch 7 into engagement so that automatic transmission 2 is shifted to a drive state in which power transmission is possible.

In step S19, total control unit 12 reads the input from engine speed sensor 22 and determines whether the engine speed Ve reaches the target engine speed Vt. The target engine speed Vt corresponds to the engine idle speed as described above. If Yes in step S19, the routine goes to step S20.

In step S20, total control unit 12 causes motor controller 13 to stop AC motor/generator 9, thereby finishing the motoring of engine 1.

In step S21, total control unit 12 sets an idle-stop prohibition flag IS_P_FLG to "1". In the initial setting, the idle-stop prohibition flag IS_P_FLG is set to "0". Once the idle-stop prohibition flag IS_P_FLG has been set to "1", total control unit 12 does not stop engine 1 automatically even when any automatic engine stop condition is satisfied. The vehicle is thus capable of continuing normal driving with its automatic engine stop/restart function disabled even in the event of a malfunction in the oil pressure controller, although the effect of improving fuel efficiency and reducing exhaust emission becomes impaired. The idle-stop prohibition flag IS_P_FLG is reset to "0" on the occasion when a predetermined maintenance is performed at a service garage etc. to fix such a malfunction in the oil pressure controller.

In step S22, total control unit 12 judges whether the automatic engine stop is requested. More specifically, total control unit 12 reads the input from accelerator pedal sensor 21, brake pedal sensor 27, brake fluid pressure sensor 28, battery controller 17, brake booster pressure sensor 26, coolant temperature sensor 20 and oil temperature sensor 18, and checks whether either one of the following conditions (1') to (6') is satisfied while the combustion proceeds in engine 1, with the selector lever of automatic transmission 2 placed in D range, the brake pedal pressed by the driver, the vehicle speed reduced to 0 km/h and all the open/close members closed.

(1') The accelerator pedal depression is smaller than or equal to a predetermined amount (e.g. 1 deg.).

(2') The brake pedal depression is larger than or equal to a predetermined amount, or the brake fluid pressure is higher than or equal to a predetermined value (e.g. 0.4 MPa).

(3') The charge state of battery 15 is larger than or equal to a predetermined level (e.g. 70% for lead-acid battery; and 55% for Ni—NH battery).

(4') The negative pressure of the brake booster is larger than or equal to a predetermined value (e.g. 11 MPa).

(5') The coolant temperature of engine 1 is higher than or equal to a predetermined value (e.g. 60° C.).

(6') The oil temperature of automatic transmission 2 is higher than or equal to a predetermined value (e.g. 60° C.).

Total control unit 12 judges that the engine stop is requested during the running of engine 1 when any of the automatic engine stop conditions (1') to (6') is satisfied. If Yes in step S22, the routine goes to step S23.

In step S23, total control unit 12 examines whether the idle-stop prohibition flag IS_P_FLG is set to "1". If No in step S23, the routine goes to step S24. If Yes in step S23, the routine goes back to step S1 without causing engine controller 16 to stop engine 1.

In step S24, total control unit 12 determines whether the oil pressure Po in automatic transmission 2 is lower than the above minimum operating pressure value Pmin. If Yes in step S24, the routine returns to step S1 without causing engine controller 15 to stop engine 1. If No in step S24, the routine goes to step S25.

In step S25, total control unit 12 causes engine controller 15 to stop engine 1 automatically.

As described above, engine 1 is automatically stopped in a normal mode in steps S1 to S14 in response to the automatic engine start request, and is automatically stopped in steps S22 to 25 in response to the automatic engine stop request. Further, engine 1 is automatically restarted in an emergency mode in steps S15 to S21 in the event that the oil pressure in automatic transmission 2 becomes lowered due to a malfunction in the oil pressure controller etc. during the automatic stop of engine 1.

Figure 3:
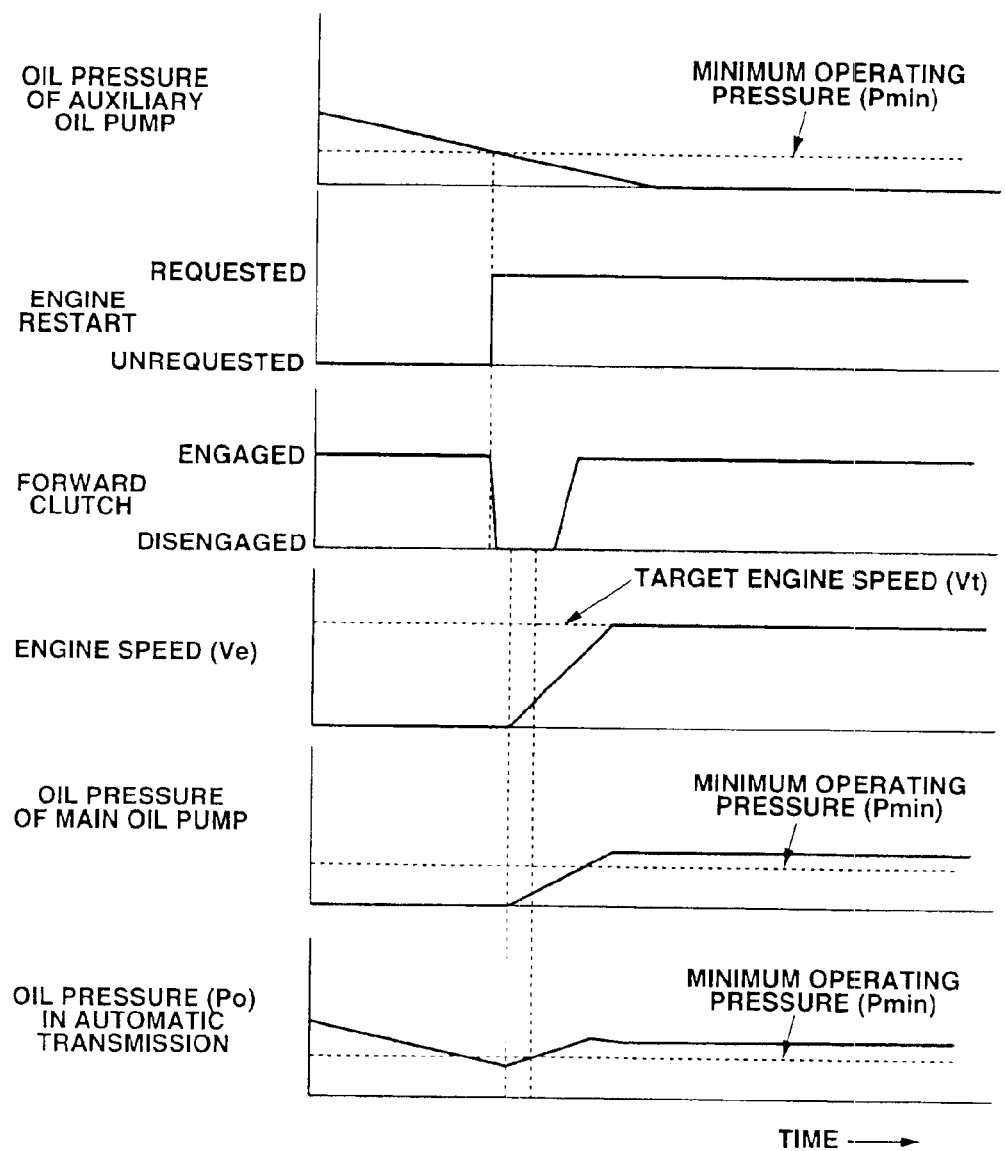
FIG. 3 is a timing diagram of automatic engine restart in an emergency mode according to the first embodiment of the present invention.

FIG. 3 shows a timing diagram of the automatic restart of engine 1 in the emergency mode.

The engine restart is requested when the oil pressure Po in automatic transmission 2 held by auxiliary oil pump 30 (i.e. the oil pressure of auxiliary oil pump 30) becomes lower than the minimum operating pressure value Po during the automatic stop of engine 1. The disengagement of forward clutch 7 is started upon the automatic engine restart request. After the lapse of time enough to complete the disengagement of forward clutch 7, the motoring of engine 1 is started by means of AC motor/generator 9. Then, ignition is caused in engine 1. Further, main oil pump 6 is actuated upon the motoring of engine 1. The oil pressure Po in automatic transmission 2 is derived from both the oil pressure of main oil pump 6 and the oil pressure of auxiliary oil pump 30, so that the oil pressure Po in automatic transmission 2 increases with the oil pressure of main oil pump 6. After the lapse of time enough to increase the oil pressure Po in automatic transmission 2 to the minimum operating pressure value Pmin, the engagement of forward clutch 7 is started.

It is possible to determine, by experiment, a time interval between the disengagement of forward clutch 7 and the motoring of engine 1 as well as a time interval from when the oil pressure Po in automatic transmission 2 reaches the minimum operating pressure value Pmin and until when the engagement of forward clutch 7 is started. It is also possible to decide on a timing for the engagement of forward clutch 7 based on the oil pressure detected by oil pressure sensor 19.

Figure 4:
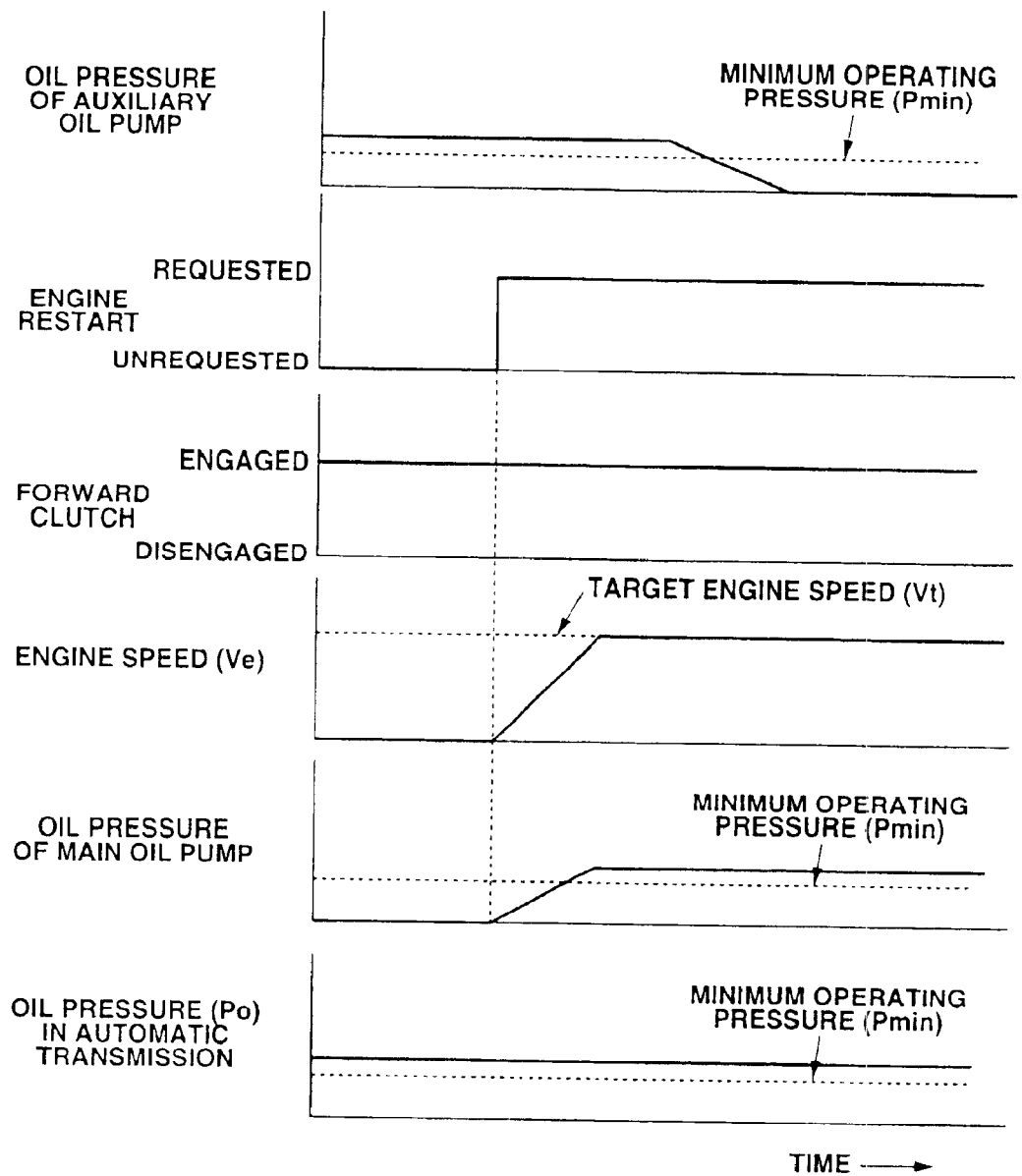
FIG. 4 is a timing diagram of automatic engine restart in a normal mode according to the first embodiment of the present invention.

FIG. 4 shows a timing diagram of the automatic restart of engine 1 in the normal mode. In this case, the oil pressure Po in automatic transmission 2 is maintained at a pressure higher than or equal to the minimum operating pressure value Pmin by means of main oil pump 6 and auxiliary oil pump 30. Thus, forward clutch 7 is kept engaged.

Figure 5:
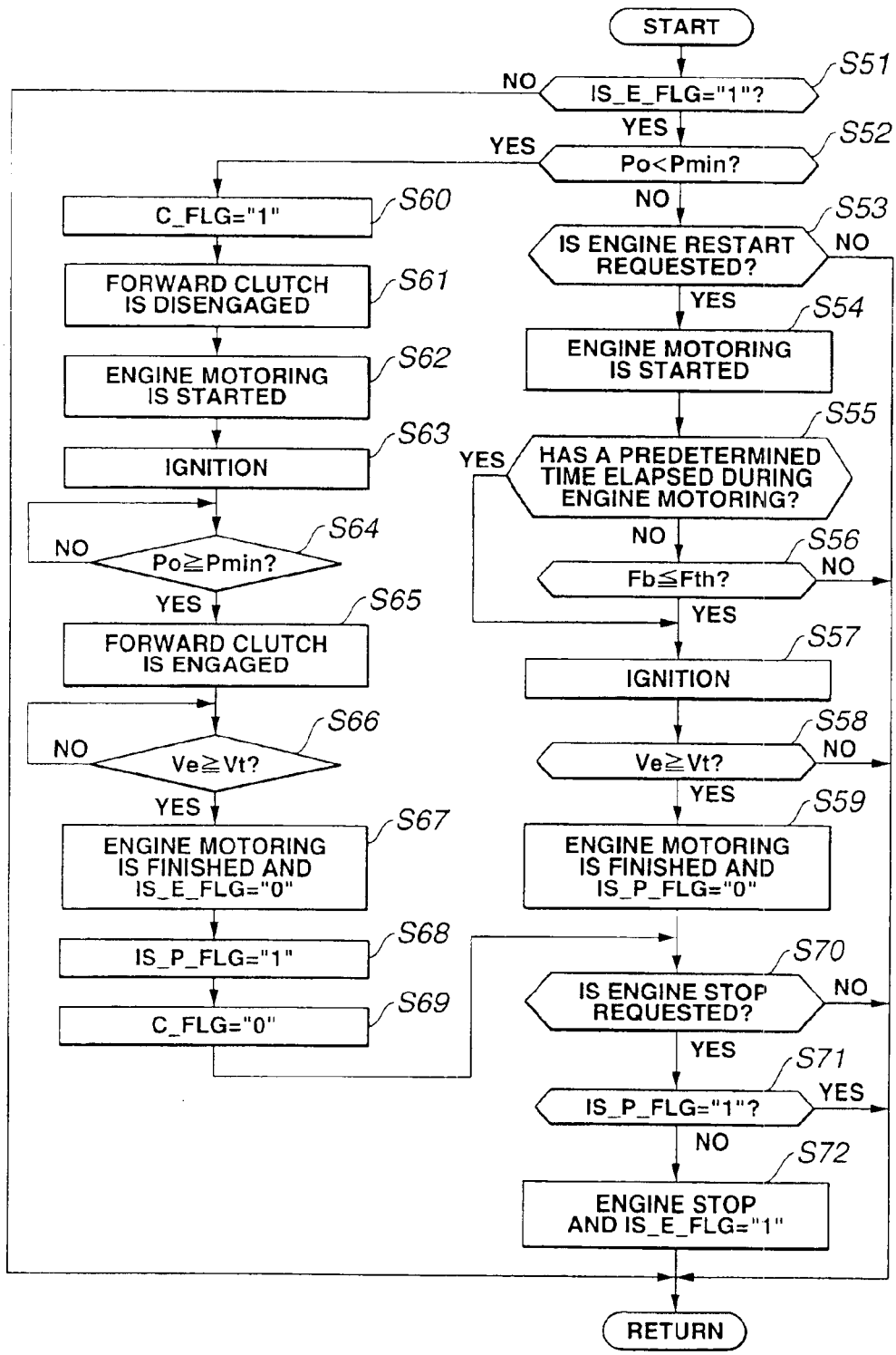
FIG. 5 is a flowchart for an automatic engine stop/restart program according to a second embodiment of the present invention.

FIG. 5 is a flow chart for an automatic engine stop/restart program ran by total control unit 12 according to the second embodiment of the present invention.

The second embodiment is designed based on the assumption that the accelerator is operated by a driver to request for the driving force while engine 1 is restarted in the emergency mode. If a throttle opening is controlled in such a situation in the same manner as controlled in normal times (i.e. if the throttle opening is increased in response to the accelerator pedal depression), excessive engine torque becomes abruptly transferred to automatic transmission 2 at the time automatic transmission 2 is shifted from the neutral state to the drive state. It is also detrimental to the durability of automatic transmission 2. In order to avoid such a detriment, the throttle opening is controlled as follows while engine 1 is restarted in the emergency mode.

In step S51, total control unit 12 examines whether an idle-stop execution flag IS_E_FLG is set to "1". The idle-stop execution flag IS_E_FLG is set to "1" during a time duration from when the automatic engine stop is requested until when the engine speed Ve is increased to a target engine speed Vt upon the automatic engine start request (i.e. a time duration from when any automatic engine stop condition is satisfied until when complete combustion occurs in engine 1). The idle-stop execution flag IS_E_FLG remains "1" at the time the starting of AC motor/generator 9 is requested upon satisfaction of any automatic engine restart condition. If Yes in step S51, the routine goes to step S52. If No in step S51, the routine goes to step S69.

In step S52, total control unit 12 determines whether the oil pressure Po in automatic transmission 2 becomes lower than a minimum operating pressure value Pmin during the automatic stop of engine 1. The minimum operating pressure value Pmin is defined as in the first embodiment. If No in step S52, the routine goes to step S53. If Yes in step S52, the routine goes to step S60.

In step S53, total control unit 12 judges whether the automatic engine restart is requested. More specifically, total control unit 12 reads the input from accelerator pedal sensor 21, brake pedal sensor 27, brake fluid pressure sensor 28, battery controller 17, brake booster pressure sensor 26, coolant temperature sensor 20 and oil temperature sensor 18, and checks whether either one of the following conditions is satisfied during the automatic stop of engine 1, with the selector lever of automatic transmission 2 held in D range, the brake pedal pressed by a driver, the vehicle speed being 0 km/h and all the open/close members closed.

(1) The accelerator pedal depression is larger than or equal to a predetermined amount (e.g. 2 deg.).

(2) The brake pedal depression is smaller than or equal to a predetermined amount, or the brake fluid pressure is lower than or equal to a predetermined value (e.g. 0.3 MPa).

(3) The charge state of battery 15 is smaller than or equal to a predetermined level (e.g. 60% for lead-acid battery; and 45% for Ni—NH battery).

(4) The negative pressure of the brake booster is smaller than or equal to a predetermined value (e.g. 8 MPa).

(5) The coolant temperature of engine 1 is lower than or equal to a predetermined value (e.g. 55° C.).

(6) The oil temperature of automatic transmission 2 is lower than or equal to a predetermined value (e.g. 55° C.).

Total control unit 12 judges that the automatic engine restart is requested when any of the automatic engine restart conditions (1) to (6) is satisfied. If No in step S53, the routine returns to step S51. If Yes in step S53, the routine goes to step S54.

In step S54, total control unit 12 immediately causes motor controller 13 to actuate AC motor/generator 9 in the power running mode, thereby starting the motoring of engine 1.

In step S55, total control unit 12 examines whether a predetermined time period (e.g. 1 to 2 seconds) has elapsed since the motoring of engine 1 is started. If No in step S56, the routine goes to step S56.

In step S56, total control unit 12 judges whether the braking force Fb becomes smaller than or equal to a predetermined threshold Fth at which ignition is permitted. The braking force is generally proportional to the brake pedal depression and the brake fluid pressure. Based on the input from brake pedal sensor 27 or brake fluid pressure sensor 28, total control unit 12 can thus judge the braking force Fb to be smaller than or equal to the threshold Fth when the brake pedal depression is smaller than or equal to a predetermined ignition permit threshold amount or the brake fluid pressure is smaller than or equal to a predetermined ignition permit threshold value. If Yes in step S56, the routine goes to step S57.

If Yes in step S55, the routine goes to step S57 regardless of whether the braking force is lower than or equal to the threshold (i.e. whether the brake fluid pressure or brake pedal depression is smaller or equal to the threshold amount or value).

In step S57, total control unit 12 allows engine controller 16 to cause ignition in engine 1.

In step S58, total control unit 12 reads the input from engine speed sensor 22 and determines whether the engine speed Ve reaches a target engine speed Vt. The target engine speed Vt corresponds to an engine idle speed. In consideration of engine speed overshoot, total control unit 12 determines that the engine speed Ve comes to the above target engine speed Vt when the engine speed Ve is kept to at least the target engine speed Vt for a predetermine time period. If Yes in step S58, the routine goes to step S59. If no in step S58, the routine returns to step S51.

In step 59, total control unit 12 causes motor controller 13 to stop AC motor/generator, thereby finishing the motoring of engine 1. Then, total control unit 12 sets the idle-stop execution flag IS_E_FLG to "0" upon judging that engine 1 has automatically restarted from the automatic stop state.

In a case where the oil pressure Po in automatic transmission 2 becomes lower than the above minimum operating pressure value Pmin during the automatic stop of engine 1 (Yes in step S52), it is conceivable that there is a malfunction in the oil pressure controller e.g. motor 32 used to actuate auxiliary oil pump 30. Thus, engine 1 needs to be restarted to drive main oil pump 6 and to thereby increase the oil pressure Po in automatic transmission 2. However, if forward clutch 7 is being engaged at the time of restart of engine 1, engine torque is transferred to automatic transmission 2 with the oil pressure Po in automatic transmission 2 being lowered. In particular, there is a high possibility that a pulley is not pressed against the torque transferring belt of CVT unit 5 sufficiently due to a drop in CVT line pressure etc., so that torque transferring belt of CVT unit 5 slips. It is detrimental to the durability of automatic transmission 2, notably the torque transferring belt of CVT unit 5. In order to avoid such a detriment, engine 1 is restarted by the following procedure.

In step S60, total control unit 12 set a clutch flag C_FLG to "1".

In step 61, total control unit 12 causes CVT controller 31 to bring forward clutch 7 into disengagement so that automatic transmission 2 is shifted into a neutral state.

In step 62, total control unit 12 immediately causes motor controller 13 to actuate AC motor/generator 9 in the power running mode, thereby starting the motoring of engine 1.

In step S63, total control unit 12 allows engine controller 16 to cause ignition in engine 1.

In step S64, total control unit 12 reads the input from oil pressure sensor 19 and determines whether the oil pressure Po in automatic transmission 2 becomes larger than or equal to the minimum operating pressure value Pmin. If Yes in step S64, the routine goes to step S65.

In step S65, total control unit 12 causes CVT controller 31 to bring forward clutch 7 into engagement so that automatic transmission is shifted to a drive range in which power transmission is possible.

In step S66, total control unit 12 reads the input from engine speed sensor 22 and determines whether the engine speed Ve reaches the target engine speed Vt. The target engine speed Vt corresponds to the engine idle speed as described above. If Yes in step S66, the routine goes to step S67.

In step S67, total control unit 12 causes motor controller 13 to stop AC motor/generator 9, thereby finishing the motoring of engine 1. Further, total control unit 12 sets the idle-stop execution flag IS_E_FLG to "0" upon judging that engine 1 has automatically restarted from the automatic stop state.

In step S68, total control unit 12 sets an idle-stop prohibition flag IS_P_FLG to "1". In the initial setting, the idle-stop prohibition flag IS_P_FLG is set to "0". Once the idle-stop prohibition flag IS_P_FLG has been set to "1", total control unit 12 does not stop engine 1 automatically even when any automatic engine stop condition is satisfied. The vehicle is thus capable of continuing normal driving with its automatic engine stop/restart function disabled even in the event of a malfunction in the oil pressure controller, although the effect of improving fuel efficiency and reducing exhaust emission becomes impaired. The idle-stop prohibition flag IS_P_FLG is reset to "0" on the occasion when a predetermined maintenance is performed at a service garage etc. to troubleshoot such a malfunction.

In step S69, total control unit 12 sets the clutch flag C_FLG to "0".

In step S70, total control unit 12 judges whether the automatic engine stop is requested. More specifically, total control unit 12 reads the input from accelerator pedal sensor 21, brake pedal sensor 27, brake fluid pressure sensor 28, battery controller 17, brake booster pressure sensor 26, coolant temperature sensor 20 and oil temperature sensor 18, and checks whether either one of the following conditions (1') to (6') is satisfied while the combustion proceeds in engine 1, with the selector lever of automatic transmission 2 placed in D range, the brake pedal pressed by the driver, the vehicle speed being reduced to 0 km/h and all the open/close members closed.

(1') The accelerator pedal depression is smaller than or equal to a predetermined amount (e.g. 1 deg.).
(2') The brake pedal depression is larger than or equal to a predetermined amount, or the brake fluid pressure becomes higher than or equal to a predetermined value (e.g. 0.4 MPa).
(3') The charge state of battery 15 is larger than or equal to a predetermined level (e.g. 70% for lead-acid battery; and 55% for Ni—NH battery).
(4') The negative pressure of the brake booster is larger than or equal to a predetermined value (e.g. 11 MPa).
(5') The coolant temperature of engine 1 is higher than or equal to a predetermined value (e.g. 60° C.).
(6') The oil temperature of automatic transmission 2 is higher than or equal to a predetermined value (e.g. 60° C.).

Total control unit 12 judges that the automatic engine stop is requested when any of the automatic engine stop conditions (1') to (6') is satisfied. If No in step S70, the routine returns to step S51. If Yes in step S70, the routine goes to step S71.

In step S71, total control unit 12 examines whether the idle-stop prohibition flag IS_P_FLG is set to "1". If Yes in step S71, the routine goes back to step S51 without causing engine controller 16 to stop engine 1. If No in step S71, the routine goes to step S72.

In step S72, total control unit 12 causes engine controller 16 to stop engine 1 automatically, and then, sets the idle-stop execution flag IS_E_FLG to "1".

As described above, engine 1 is automatically stopped in the normal mode in steps S51 to S59 in response to the automatic engine start request, and is automatically stopped in steps S70 to 72 in response to the automatic engine stop request. Further, engine 1 is automatically restarted in the emergency mode in steps S60 to S69 in the event that the oil pressure in automatic transmission 2 becomes lowered due to a malfunction in the oil pressure controller etc. during the automatic stop of engine 1.

Figure 6:
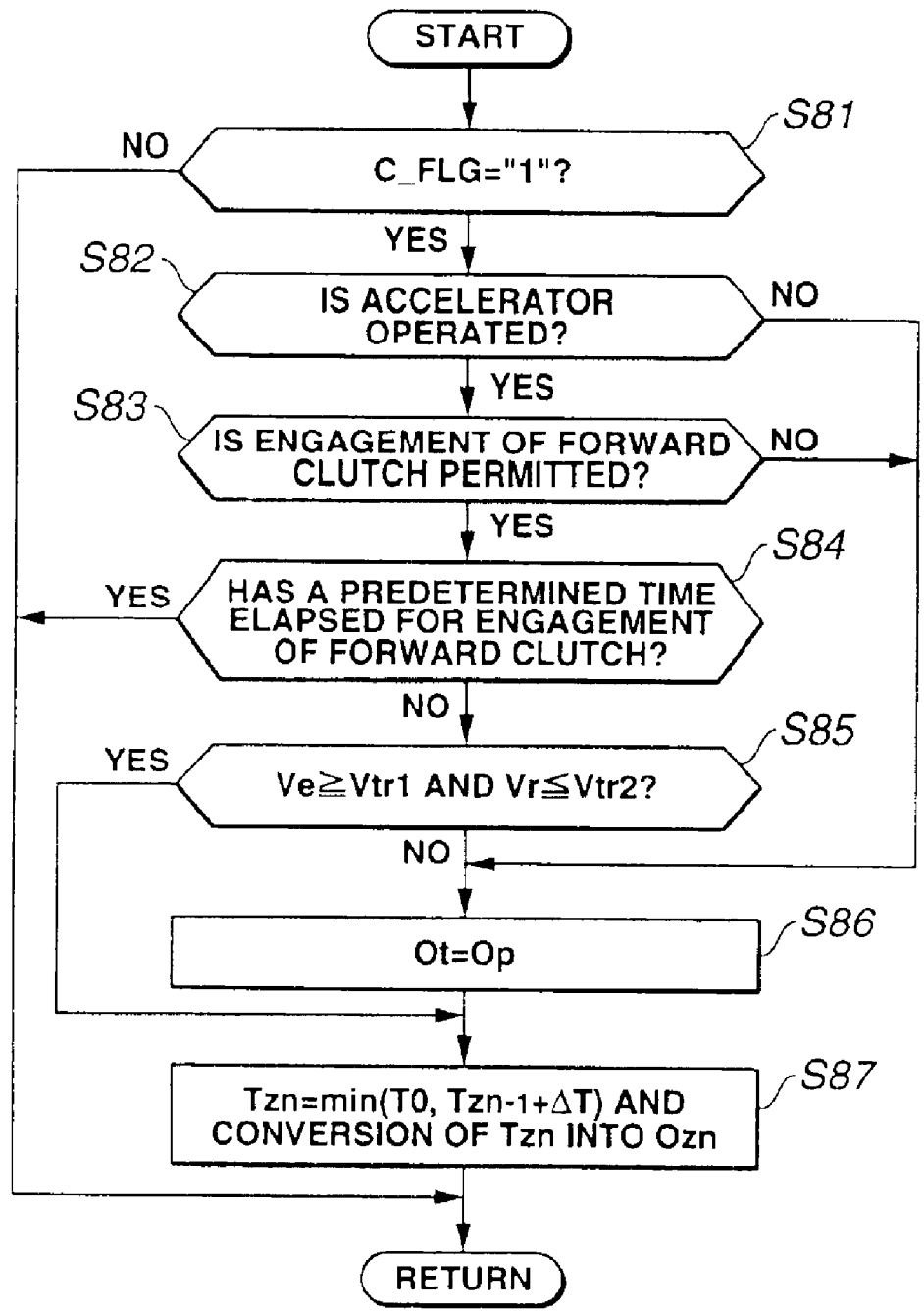
FIG. 6 is a flowchart for a throttle opening control program according to the second embodiment of the present invention.

FIG. 6 is a flow chart for a throttle opening control program ran by total control unit 12 according to the second embodiment of the present invention. The following routine of steps S81 to 87 is performed in parallel to the above routine of steps S51 to S72.

In step S81, total control unit 12 examines whether the clutch flag C_FLG is set to "1" (i.e. whether engine 1 is in process of being restarted in the emergency mode in steps S60 to S69 due to the oil pressure Po in automatic transmission 2) lower than the minimum operating pressure value Pmin. If Yes in step S81, the routine goes to step S82. If No in step S81, the routine goes to step S87.

In step S82, total control unit 12 examines whether the accelerator is operated by the driver (i.e. whether the accelerator pedal depression is not "0") while engine 1 is restarted in the emergency mode. If Yes in step S82, the routine goes to step S83. If No in step S82, the routine goes to step S86.

In the subsequent steps S83 to S86, total control unit 12 determines whether or not to control the throttle opening in accordance with the driver's accelerator operation (i.e. the accelerator pedal depression) to develop the driving force.

In step S83, total control unit 12 determines whether the engagement of forward clutch 7 is permitted. If Yes in step S83, the routine goes to step S84. If No in step S83, the routine goes to step S86.

In step S84, total control unit 12 examines whether an enough time period (e.g. about 1 second) for the engagement of forward clutch 7 has elapsed after the engagement of forward clutch 7 is started. If No in step S84, the routine goes to step S85. If Yes in step S84, the routine goes to step S87 without checking for the engine speed Ve and the output shaft rotation speed Vr of torque converter 4 as follows.

In step S85, total control unit 12 reads the input from engine speed sensor 22 and torque converter sensor 29 and determines whether the engine speed Ve becomes larger than or equal to a first threshold value Vth1 and, at the same time, the output shaft rotation speed Vr of torque converter 4 becomes smaller than or equal to a second threshold value Vth2. The first threshold value Vth1 is lower than the engine idle speed. As forward clutch 7 is moved into engagement with the engine speed Ve increased, the output shaft rotation speed Vr becomes lowered (i.e. the output shaft rotation speed Vr is not synchronism with the engine speed Ve). Herein, there is a time lag between the instant the engine torque is enhanced by increasing the throttle opening Ot and the instant the enhanced engine torque reaches automatic transmission 2. The first and second threshold values Vth1 and Vth2 are set in consideration of such a time lag. Namely, total control unit 12 judges automatic transmission 2 to be practically shifted to the drive state when the engine speed Ve and the output shaft rotation speed Vr of torque converter 4 reach the threshold values Vth1 and Vth2, respectively; and total control unit 12 starts increasing the throttle opening Ot to enhance the engine torque upon such a judgment, so that automatic transmission 2 is completely placed in the drive state by the engagement of forward clutch 7 at the instant when the enhanced engine torque reaches automatic transmission 2. It is thus possible to decide on the timing to increase the throttle opening Ot by monitoring whether the engine speed Ve becomes larger than or equal to the first threshold value Vth1 and the output shaft rotation speed Vr of torque converter 4 becomes smaller than or equal to the second threshold value Vth2. If Yes in step S85, the routine goes to step S87. If No in step S85, the routine goes to step S86 upon judging that the throttle opening needs to be limited to a certain level without reference to the driver's accelerator operation.

In step S86, total control unit 12 causes engine controller 16 to limit the throttle opening Ot to a prescribed opening amount Op. The prescribed opening amount is defined as a throttle opening necessary to secure an intake air amount for the starting of engine 1. In a case where engine 1 has a piston displacement of about 2000 cc and the coolant temperature of engine 1 is about 60° C., for example, the prescribed opening amount Op is set to secure an intake air amount of about 80 l/min. This makes it possible to prevent excessively large engine torque from being abruptly transferred to automatic engine 2 at the time automatic transmission 2 is shifted from the neutral state to the drive state.

In step S87, total control unit 12 causes engine controller 16 to increase the throttle opening Ot to a target throttle opening amount at a gradual rate. The target throttle opening amount is determined in accordance with the driver's accelerator operation (i.e. the accelerator pedal depression). In the second embodiment, the throttle opening Ot is increased by calculating a throttle opening command value Ozn cyclically as follows. Firstly, a comparison of values T0 and Tzn−1+ ΔT is made with the proviso that T0 is a target engine torque determined based on the driver's accelerator operation, ΔT is the increment of engine torque per cycle (corresponding to the above graduate rate of throttle opening increase), and Tzn−1 is an engine torque command value calculated in the preceding calculation cycle. The smaller value of T0 and Tzn−1+ΔT is determined as an engine torque command value Tzn in the present calculation cycle. The calculated engine torque command value Tzn is converted into a throttle opening command value Ozn by a predetermined computing process. The throttle opening Ot is then adjusted to the throttle opening command value Ozn. The rate of throttle opening increase i.e. the value ΔT is set so as to avoid driver discomfort from being caused by a sudden change in the driving force, and may be determined by experiment. For example, the value ΔT is set to 3 Nm/10 ms.

Figure 7:
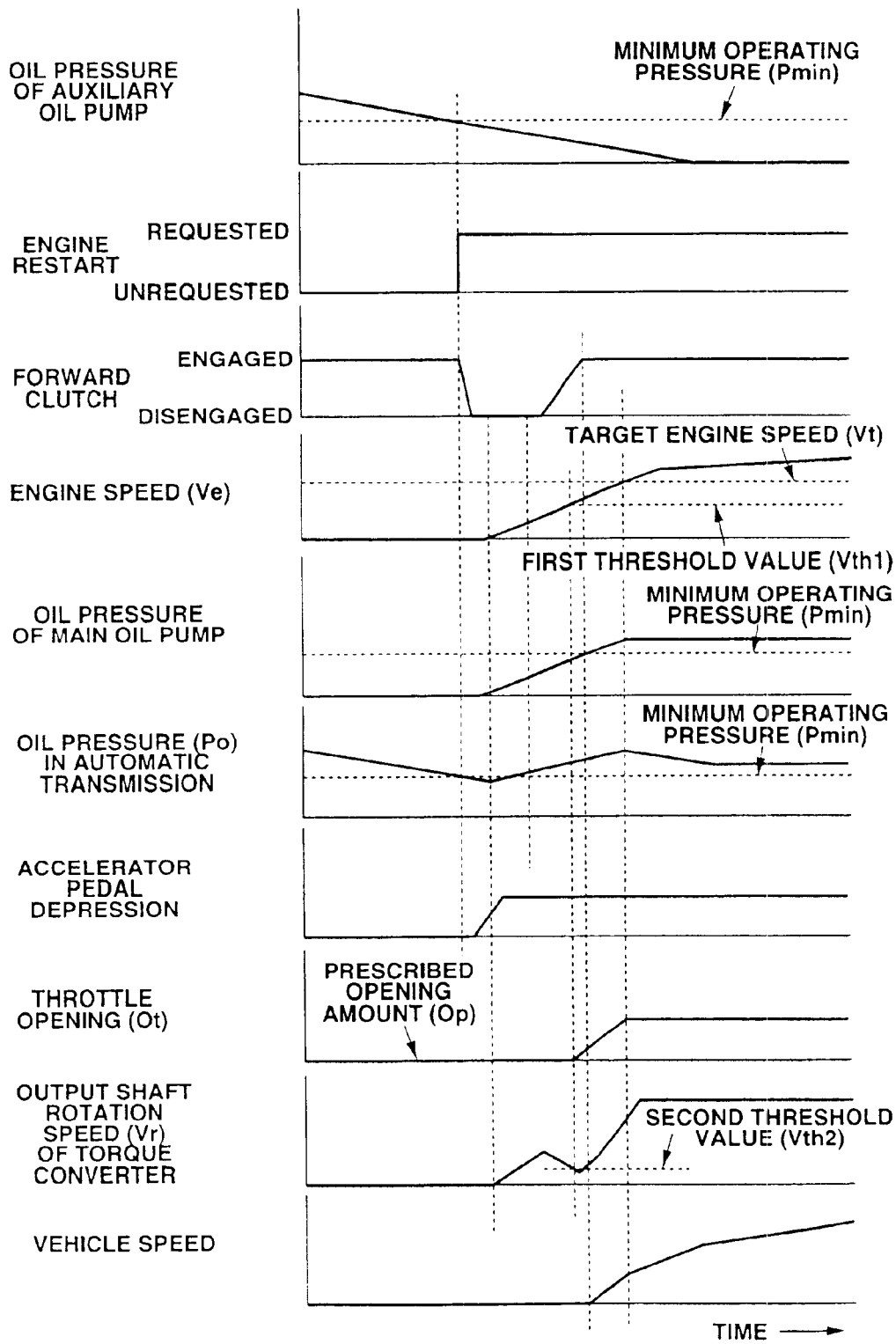
FIG. 7 is a timing diagram of automatic engine restart in an emergency mode according to the second embodiment of the present invention.

FIG. 7 shows a timing diagram of the automatic restart of engine 1 in the emergency mode.

The automatic engine restart is requested when the oil pressure Po in automatic transmission 2 (i.e. the oil pressure Po of auxiliary oil pump 30) becomes lower than the minimum operating pressure value Pmin. The disengagement of forward clutch 7 is started upon the automatic engine restart request. After the lapse of time enough to complete the disengagement of forward clutch 7, the motoring of engine 1 is started by means of AC motor/generator 9. Then, ignition is caused in engine 1. Further, main oil pump 6 is started on the motoring of engine 1. The oil pressure Po in automatic transmission 2 is derived from both the oil pressure of main oil pump 6 and the oil pressure of auxiliary oil pump 30, so that the oil pressure Po in automatic transmission 2 increases with the oil pressure of main oil pump 6. After the lapse of time enough to increase the oil pressure Po of automatic transmission 2 to the minimum operating pressure value Pmin, the engagement of forward clutch 7 is started.

It is possible to determine, by experiment, a time interval between the disengagement of forward clutch 7 and the motoring of engine 1 is started as well as a time interval from when the oil pressure Po of automatic transmission 2 reaches the minimum operating pressure value Pmin and until when the engagement of forward clutch 7 is started. It is also possible to decide on a timing for the engagement of forward clutch 7 based on the oil pressure detected by oil pressure sensor 19.

Even if the accelerator is operated in the meantime, the throttle opening Ot is maintained at the above prescribed opening amount Op until the engine speed Ve and the rotation speed Vr of the output shaft of torque converter 4 reach the threshold values Vth1 and Vth2, respectively. After that, the throttle opening Ot is increased at the graduate rate.

According to the above-described first and second embodiment of the present invention, engine 1 is automatically restarted in the emergency mode in the event that the oil pressure Po in automatic transmission 2 becomes lowered during the automatic stop of engine 1. Automatic transmission 2 is shifted into the neutral state before the automatic restart of engine 1, and then, is shifted into the drive state after the oil pressure Po in automatic transmission 2 is increased to the minimum operating pressure value Pmin by the automatic restart of engine 1. Engine power is transferred to CVT unit 5 with the oil pressure Po in automatic transmission 2 increased to a sufficient degree, whereby the engine becomes able to restart from the automatic stop state without deteriorating the durability of automatic transmission 2.

Many alternative automatic engine stop/restart programs are possible. For example, the oil pressure Po in automatic transmission 2 is larger than or equal to the minimum operating pressure value Pmin when the engine speed Ve reaches the target engine speed Vt. It is thus possible to enable the engagement of forward clutch 7 when the engine speed Ve reaches the target engine speed Vt. In such a case, the procedure for restarting engine 1 automatically in the emergency mode is as follows: forward clutch 7 is disengaged, when the oil pressure Po in automatic transmission 2 becomes lowered than the minimum operating pressure value Pmin during the automatic stop of engine 1; AC motor/generator 9 is started to cause the motoring of engine 1 (and the idle-stop execution flag IS_E_FLG is set to "0"); ignition is caused in engine 1; the engine speed Ve attains the target engine speed Vt; AC motor/generator 9 is stopped to finish the motoring of engine 1; forward clutch 7 is engaged; and then, the idle-stop prohibition flag IS_P_FLG is set to "1".

The entire contents of Japanese Patent Application Nos. 2002-120382 (filed on Apr. 23, 2002) and 2002-350655 (filed on Dec. 3, 2002) are herein incorporated by reference.

Although the present invention has been described with reference to specific embodiments of the invention, the invention is not limited to the above-described embodiments. Various modification and variation of the embodiments described above will occur to those skilled in the art in light of the above teaching. The scope of the invention is defined with reference to the following claims.

What is claimed is:

1. A vehicle with an automatic engine stop/restart function, comprising:
   an engine;
   an automatic transmission having an oil pump driven in synchronism with the engine to supply an oil pressure to the automatic transmission;
   an oil pressure controller to hold the oil pressure in the automatic transmission during an automatic stop of the engine; and
   a control system configured to:
      stop the engine automatically when an automatic engine stop condition is satisfied;
      restart the engine automatically in a first mode when an automatic engine restart condition is satisfied;
      determine whether the oil pressure in the automatic transmission becomes lower than a predetermined value during the automatic stop of the engine;
      shift the automatic transmission into a neutral state when the oil pressure in the automatic transmission becomes lower than a predetermined value during the automatic stop of the engine;
      restart the engine in a second mode after the automatic transmission is shifted to the neutral state; and
      shift the automatic transmission into a drive state after the oil pressure in the automatic transmission is increased to the predetermined value by the oil pump driven in synchronism with the engine.

2. The vehicle according to claim 1, wherein the control system is further configured to limit a throttle opening of the engine to a prescribed opening amount necessary to restart the engine without reference to a driver's accelerator operation until the automatic transmission is shifted to the drive state, when the oil pressure in the automatic transmission becomes lower than the predetermined value during the automatic stop of the engine.

3. The vehicle according to claim 2, wherein the control system is further configured to increase the throttle opening at a graduate ratio to achieve an engine torque corresponding to the driver's accelerator operation when the automatic transmission is shifted to the drive state.

4. The vehicle according to claim 3, wherein the automatic transmission has a torque converter to receive the torque from the engine; and
   the control system is configured to allow the throttle opening to be increased at the graduate rate when an engine speed is higher than or equal to a first threshold value and an output shaft rotation speed of the torque converter is lower than or equal to a second threshold value.

5. The vehicle according to claim 1, wherein the control system is further configured to prohibit the engine from being automatically stopped even when the automatic engine stop condition is satisfied, once the engine has been automatically restarted in the second mode.

6. The vehicle according to claim 1, wherein the oil pressure controller has:
   a motor; and
   an oil pump driven by the motor.

7. The vehicle according to claim 1, wherein the automatic transmission has a belt-type continuously variable transmission unit.

8. The vehicle according to claim 1, wherein the automatic transmission has a forward clutch engaged and disengaged to shift the automatic transmission between the drive state and the neutral state.

9. An automatic engine stop/restart system for a vehicle, the system comprising:

means for stopping an engine automatically upon satisfaction of an automatic engine stop condition;

means for determining whether an oil pressure in an automatic transmission of the vehicle becomes lower than a predetermined value during an automatic stop of the engine;

means for restarting the engine automatically upon satisfaction of an automatic engine restart condition, when the oil pressure in the automatic transmission is higher than or equal to the predetermine value;

means for shifting the automatic transmission into a neutral state, when the oil pressure in the automatic transmission becomes lower than the predetermined value during the automatic stop of the engine;

means for restarting the engine automatically while the automatic transmission is in the neutral state; and means for shifting the automatic transmission from the neutral state to a drive state after the oil pressure in the automatic transmission is increased to the predetermined value by an oil pump driven in synchronism with the engine.

10. An automatic engine stop/restart method for a vehicle, the method comprising:

determining whether an oil pressure in an automatic transmission of the vehicle becomes lower than a predetermined value while an engine of the vehicle is in an automatic stop state;

restarting the engine automatically from the automatic stop state upon satisfaction of an automatic engine restart condition, when the oil pressure in the automatic transmission is higher than or equal to the predetermined value;

shifting the automatic transmission into a neutral state, when the oil pressure in the automatic transmission is lower than the predetermined value;

restarting the engine automatically from the automatic stop state while the automatic transmission is in the neutral state; and shifting the automatic transmission from the neutral state to a drive state, after the oil pressure in the automatic transmission is increased to the predetermined value by an oil pump driven in synchronism with the engine.

11. The automatic engine stop/restart method according to claim 10, further comprising limiting a throttle opening of the engine to a prescribed opening amount necessary to restart the engine without reference to an driver's accelerator operation until the automatic transmission is shifted to the drive state, when the oil pressure in the automatic transmission becomes lower than the predetermined value.

12. The automatic engine stop/restart method according to claim 11, further comprising increasing the throttle opening at a graduate ratio to achieve an engine torque corresponding to the driver's accelerator operation, when the automatic transmission is shifted to the drive state.

13. The automatic engine stop/restart method according to claim 12, further comprising:

determining whether an engine speed becomes higher than or equal to a first threshold value and an output shaft rotation speed of a torque converter of the automatic transmission becomes lower than or equal to a second threshold value; and allowing the throttle opening to be increased at the graduate rate when the engine speed is higher than or equal to the first threshold value and the output shaft rotation speed of the torque converter is lower than or equal to the second threshold value.

14. The automatic engine stop/restart method according to claim 10, further comprising prohibiting the engine from being automatically stopped even when the automatic engine stop condition is satisfied, once the engine has been automatically restarted after the oil pressure in the automatic transmission became lower than the predetermined value.

* * * * *